(12) United States Patent
Silventoinen et al.

(10) Patent No.: US 6,738,365 B1
(45) Date of Patent: May 18, 2004

(54) METHOD OF IMPROVING CONNECTION QUALITY AND SYSTEM CAPACITY, AND A CELLULAR RADIO SYSTEM

(75) Inventors: Marko Silventoinen, Helsinki (FI); Harri Posti, Oulu (FI); Harri Jokinen, Hiisi (FI); Jari Ryynänen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/308,943

(22) PCT Filed: Nov. 26, 1997

(86) PCT No.: PCT/FI97/00727
§ 371 (c)(1),
(2), (4) Date: Jun. 24, 1999

(87) PCT Pub. No.: WO98/24194
PCT Pub. Date: Jun. 4, 1998

(30) Foreign Application Priority Data

Nov. 27, 1996  (FI) .................................................. 964731

(51) Int. Cl.⁷ .............................. H04J 3/00; H04B 7/00
(52) U.S. Cl. ..................... 370/336; 370/345; 370/442; 370/498; 455/509; 455/450; 455/516
(58) Field of Search .................. 370/321, 326, 370/336, 337, 345, 347, 442–444, 478, 498, 508–512; 455/436–453, 509, 103, 112, 516, 450, 451, 452.1, 452.02

(56) References Cited

U.S. PATENT DOCUMENTS

| | | | | |
|---|---|---|---|---|
| 4,949,336 A | * | 8/1990 | Hamada et al. ............. | 370/460 |
| 5,119,502 A | | 6/1992 | Kallin et al. | |
| 5,729,539 A | * | 3/1998 | Heeschen et al. .......... | 370/332 |
| 5,740,165 A | * | 4/1998 | Vannucci .................... | 370/330 |
| 5,822,313 A | * | 10/1998 | Malek et al. ............... | 370/332 |
| 5,946,306 A | * | 8/1999 | Talarmo ..................... | 370/337 |
| 5,953,344 A | * | 9/1999 | Dail et al. ................... | 370/443 |
| 5,956,332 A | * | 9/1999 | Rasanen et al. ............ | 370/342 |
| 5,995,498 A | * | 11/1999 | Toot et al. .................. | 370/332 |
| 6,005,857 A | * | 12/1999 | Honkasalo et al. ........ | 370/337 |
| 6,028,854 A | * | 2/2000 | Raith et al. ................. | 370/321 |
| 6,240,076 B1 | * | 5/2001 | Kanerva et al. ............ | 370/330 |

FOREIGN PATENT DOCUMENTS

| | | | | |
|---|---|---|---|---|
| WO | WO 95/12258 | * | 5/1995 | ............ H04B/7/04 |
| WO | WO 96/34468 | | 10/1996 | |
| WO | WO96-34468 | * | 10/1996 | ............ H04J/3/16 |

* cited by examiner

*Primary Examiner*—William Trost
*Assistant Examiner*—Stephen M. D'Agosta
(74) *Attorney, Agent, or Firm*—Squire, Sanders & Dempsey L.L.P.

(57) ABSTRACT

A method of improving connection quality and system capacity in a cellular radio system is disclosed. Each cell in the cellular radio system has at least one base station (BS) communicating with subscriber terminals (MS) in its area. The method is characterized in that the subscriber terminal transmits in two time slots and receives in two time slots during one frame, and that the subscriber terminal employs the time slots of the frame following the frame used for transmission and reception for measuring neighboring base stations. Owing to the method and cellular radio system, methods developed for improving connection quality and system capacity in a cellular radio system, such as frequency hopping, discontinuous transmission and power control, can be used on the traffic channels of the base station BCCH carrier wave frequency.

5 Claims, 2 Drawing Sheets

| 0 RX | 1 RX | 2 | 3 TX | 4 TX | 5 | 6 MON | 7 MON |
|---|---|---|---|---|---|---|---|
| 0 MON | 1 MON | 2 MON | 3 MON | 4 MON | 5 MON | 6 MON | 7 |

| 0 RX | 1 | 2 | 3 TX | 4 | 5 MON | 6 MON | 7 |

| 0 RX | 1 RX | 2 | 3 TX | 4 TX | 5 | 6 MON | 7 MON |
| 0 MON | 1 MON | 2 MON | 3 MON | 4 MON | 5 MON | 6 MON | 7 |

METHOD OF IMPROVING CONNECTION QUALITY AND SYSTEM CAPACITY, AND A CELLULAR RADIO SYSTEM

CROSS-REFERENCE TO RELATED APPLICATIONS (Not Applicable)

STATEMENT REGARDING FEDERALLY SPONSORED RESEARCH OR DEVELOPMENT (Not Applicable)

INCORPORATION-BY-REFERENCE OF MATERIAL SUBMITTED ON A COMPACT DISC (Not Applicable)

BACKGROUND OF THE INVENTION

Field of the Invention

The invention relates to a method of improving connection quality and system capacity in a cellular radio system comprising in each cell at least one base station communicating with subscriber terminals in its area, the base station transmitting on at least one carrier wave frequency, and in the system a signal transmitted at each frequency being time divided into a frame consisting of a plurality of time slots, and the base stations transmitting information concerning themselves to the subscriber terminals.

The invention also relates to a cellular radio system comprising in each cell at least one base station communicating with subscriber terminals in its area, the base station transmitting on at least one carrier wave frequency, and in the system a signal transmitted at each frequency being time divided into a frame consisting of a plurality of time slots, and the base stations transmitting information concerning themselves to the subscriber terminals.

In a cellular radio system, user speech or data information is transmitted between a base station and a subscriber terminal on a traffic channel. In addition, various control messages and system information are needed between the base station and the subscriber terminal. Control channels are used for transmitting information of this type. In the GSM system, for example, the BCCH channel is used for transmitting connection set-up information from a base station to subscriber terminals. The BCCH channel is used for transmitting cell-specific information. Other channels transmitted in the first time slot, denoted by the number 0, of the BCCH carrier wave frequency are e.g. AGCH and PCH, used for transmitting call set-up information, and SCH and FCCH, used for synchronizing a subscriber terminal.

In the present GSM system, the carrier wave frequency included in a BCCH signal, i.e. the BCCH carrier wave frequency, is transmitted continuously at the same power level. A subscriber terminal continuously measures the power level of BCCH carrier wave frequencies transmitted by adjacent base stations, and reports the measurement results to the base station serving the subscriber terminal. On the basis of these measurement results the system decides a suitable instant for handover to another base station. In order to be able to measure signal attenuation between base stations and subscriber terminals, the BCCH carrier wave frequencies must be transmitted at a constant power level.

In the present GSM system a subscriber terminal has only a very limited time for measuring the power levels of the BCCH carrier wave frequencies of neighboring base stations. If the subscriber terminal receives a signal from the base station in the time slot 0 of a frame, it transmits a signal to the base station in the time slot 3 of the frame and measures neighboring base stations in the time slots 5 and 6 of the frame. Since reception can take place in any of the time slots 0 to 7 of a frame, transmission and base station measurement can also take place in any the time slot of a frame. This is why the BCCH carrier wave frequency must be transmitted continuously.

In the present GSM system, the requirement that the BCCH carrier wave frequency must be sent continuously at a constant power level prevents the use of certain methods developed for improving connection quality and system capacity in low-capacity base stations comprising only one radio unit. The problem is not equally severe in base stations comprising a plurality of radio units, but connection quality and system capacity are impaired even then. Methods for improving connection quality and system capacity in cellular radio systems include e.g. frequency hopping, discontinuous transmission and power control.

BRIEF SUMMARY OF THE INVENTION

It is the object of the present invention to improve connection quality and system capacity in a cellular radio system.

This is achieved with the type of method described in the preamble, characterized in that the subscriber terminal transmits in two time slots and receives in two time slots during one frame, and that the subscriber terminal employs the time slots of the frame following the frame used for transmission and reception for measuring neighboring base stations.

The cellular radio system of the invention is characterized in that the base stations and subscriber terminals comprised by the cellular radio system comprise means for transmitting in two time slots and receiving in two time slots during one frame, and that the subscriber terminals comprise means for employing the time slots of the frame following the frame used for transmission and reception for measuring neighboring base stations.

The method and cellular radio system of the invention provide distinct advantages compared with prior art. Owing to the method and cellular radio system of the invention, methods developed for improving connection quality and system capacity in a cellular radio system, such as frequency hopping, discontinuous transmission and power control, can be used on the traffic channels of the base station BCCH carrier wave frequency. The use of the method of the invention brings forth the above advantages best in low-capacity base stations comprising only one radio unit. The method also improves connection quality and system capacity in base stations comprising a plurality of radio units.

The method and cellular radio system of the invention also provide advantages under circumstances when the BCCH carrier wave frequency is transmitted continuously at a constant power level. Under such circumstances the subscriber terminals can perform more measurements in a time unit than in the present system. This again assists the system in deciding the suitable instant for handover to another base station, and consequently improves connection quality.

Frequency hopping refers to the transmission frequency used on a connection being changed at predetermined intervals. By frequency hopping, transmission quality can be improved particularly in cases when a subscriber terminal is moving very slowly or is stationary, as is often the case when a hand-held mobile telephone is used. Frequency hopping also helps in dividing the interference caused by the radio connection to several frequencies, and this results in a momentary disturbance at a given frequency remaining small.

Discontinuous transmission again is an operational state in which the transmitter is switched off for the time when there is no data to be transmitted. This contributes to reducing the interference caused by the radio connection and improves the reuse of frequencies, resulting in improved total system capacity.

Because the transmission level of a subscriber terminal and a base station can be controlled, a situation in which the transmission power of a cell would have to be increased so as to exceed the power needed in normal areas because of shadow areas in order to provide a satisfactory field strength for the shadow areas can be avoided. Such a situation would lead to the field strength being unnecessarily high in normal areas leading to impaired reuse of frequencies and consequently to reduced total system capacity.

BRIEF DESCRIPTION OF THE SEVERAL VIEWS OF THE DRAWINGS

In the following the invention will be described in more detail with reference to examples according to the attached drawings, in which.

DETAILED DESCRIPTION OF THE INVENTION

Figures 1, 2, 3:
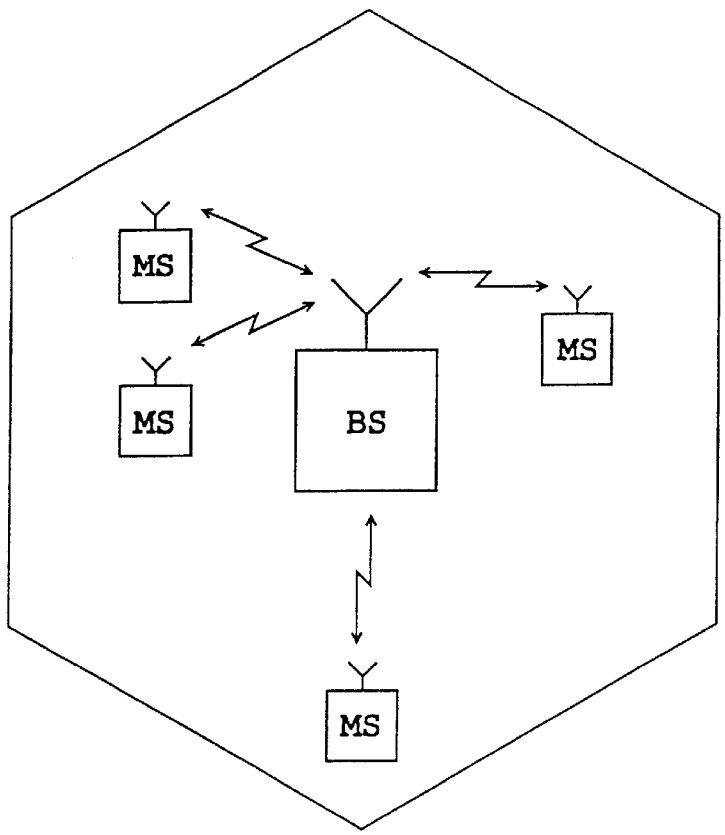
FIG. 1 shows a cellular radio system to which the method of the invention can be applied.
FIG. 2 shows the present structure of a TDMA frame of a subscriber terminal in the GSM system.
FIG. 3 shows the structure of two successive frames of a subscriber terminal in the GSM system according to method of the invention.

FIG. 1 illustrates a cellular radio system to which the method of the invention can be applied. In the cellular radio system each cell comprises at least one base station BS communicating with subscriber terminals MS in its area. In cellular radio systems, user speech and data traffic is transmitted between the base station and a subscriber terminal on traffic channels. In addition, various control messages and system information are needed between the base station and the subscriber terminal, and these are transmitted on control channels. The method of the invention can be applied to any cellular radio system utilizing the time division TDMA multiple access system. In the following, the method of the invention will be described in the GSM system, but it is by no means to be so restricted.

FIG. 2 illustrates the present structure of a TDMA frame of a subscriber terminal in the GSM system. In the GSM system, a TDMA frame comprises eight time slots which are numbered from 0 to 7. One cell may employ a plurality of carrier wave frequencies. GSM cells always comprise one carrier wave frequency, the first time slot, denoted by the number 0, of whose TDMA frame is used for transmitting connection set-up information, i.e. the BCCH channel, from the base station to subscriber terminals. The base station uses the same time slot for acknowledging the connection set-up signal transmitted by the subscriber terminal. Here, the above frequency is called the BCCH carrier wave frequency. Being in a free state, subscriber terminals listen to the BCCH channels of a base station. They must always know the frequencies at which the BCCH signal is being transmitted. Consequently, the BCCH carrier wave frequency in the present GSM system does not comprise frequency hopping.

In the present GSM system, the BCCH carrier wave frequency is transmitted continuously at a constant power level. A subscriber terminal continuously measures the power levels of the BCCH carrier wave frequencies of adjacent base stations and reports the measurement results to the base station serving the subscriber terminal. On the basis of these measurement results the system decides the suitable instant for handover to another base station. In order to be able to measure signal attenuation between base stations and subscriber terminals, the BCCH carrier wave frequencies must be transmitted at a constant power level.

In the present GSM system, a subscriber terminal has only a very limited time for measuring the power levels of the BCCH carrier wave frequencies of neighboring base stations, as can be seen from FIG. 2. In FIG. 2, RX denotes the time slot of a frame in which the subscriber terminal receives, and TX the time slot of a frame in which the subscriber terminal transmits. In the GSM system, a subscriber terminal transmits and receives at different frequencies, i.e. the different transmission directions have dedicated frequencies. MON again denotes the time slots of a frame in which the subscriber terminal measures neighboring base stations. If a subscriber terminal receives a signal from the base station in the time slot 0 of a frame, it transmits a signal to the base station in the time slot 3 of the frame and measures neighboring base stations in the time slots 5 and 6 of the frame. Since reception can take place in any one of the time slots 0 to 7 of a frame, transmission and base station measurement can also take place in any the time slot of a frame. This is why the BCCH carrier wave frequency must be transmitted continuously.

FIG. 3 illustrates the structure of two successive frames of a subscriber terminal in the GSM system according to the method of the invention. In FIG. 3, RX denotes the time slot of a frame in which the subscriber terminal receives, and TX the time slot of the frame in which the subscriber terminal transmits. MON again denotes the time slots of the frame in which the subscriber terminal measures neighboring base stations. In the method of the invention, the subscriber terminal receives in two time slots and transmits in two time slots during one frame, and the subscriber terminal employs the following frame for measuring neighboring base stations. This means that the subscriber terminal employs every second frame for reception and transmission and every second for measuring neighboring base stations. For example, if the subscriber terminal receives a signal from the base station in the time slots 0 and 1 of a first frame, it transmits a signal to the base station in the time slots 3 and 4 of the first frame. Owing to this, the subscriber terminal can measure the neighboring base stations for a period starting in the time slot 6 of the first frame and continuing uninterrupted up to the time slot 6 of a second frame. Consequently, the subscriber terminal can use up to nine successive time slots for measuring neighboring base stations. Since the subscriber terminal can use at least eight successive time slots for measuring neighboring base stations, it is able to measure the time slot 0 of the base station BCCH carrier wave frequency, i.e. the BCCH channel, at least during two successive frames. Since the subscriber terminal is able to measure the time slot 0 of the BCCH carrier wave frequency during at least two successive frames, frequency hopping, discontinuous transmission and power control can be used in the other time slots 1 to 7 of the BCCH carrier wave frequency for improving connection quality and system capacity.

Owing to the method and cellular radio system of the invention, only the time slot 0, i.e. the BCCH channel, of the BCCH carrier wave frequency has to be sent continuously at a constant power level. In the present GSM system, all the time slots 0 to 7 of the BCCH carrier wave frequency are transmitted continuously at a constant power level, i.e. both the BCCH channel and traffic channels. The method of the invention does not affect the data transmission rate of the traffic channels.

Figure 4:
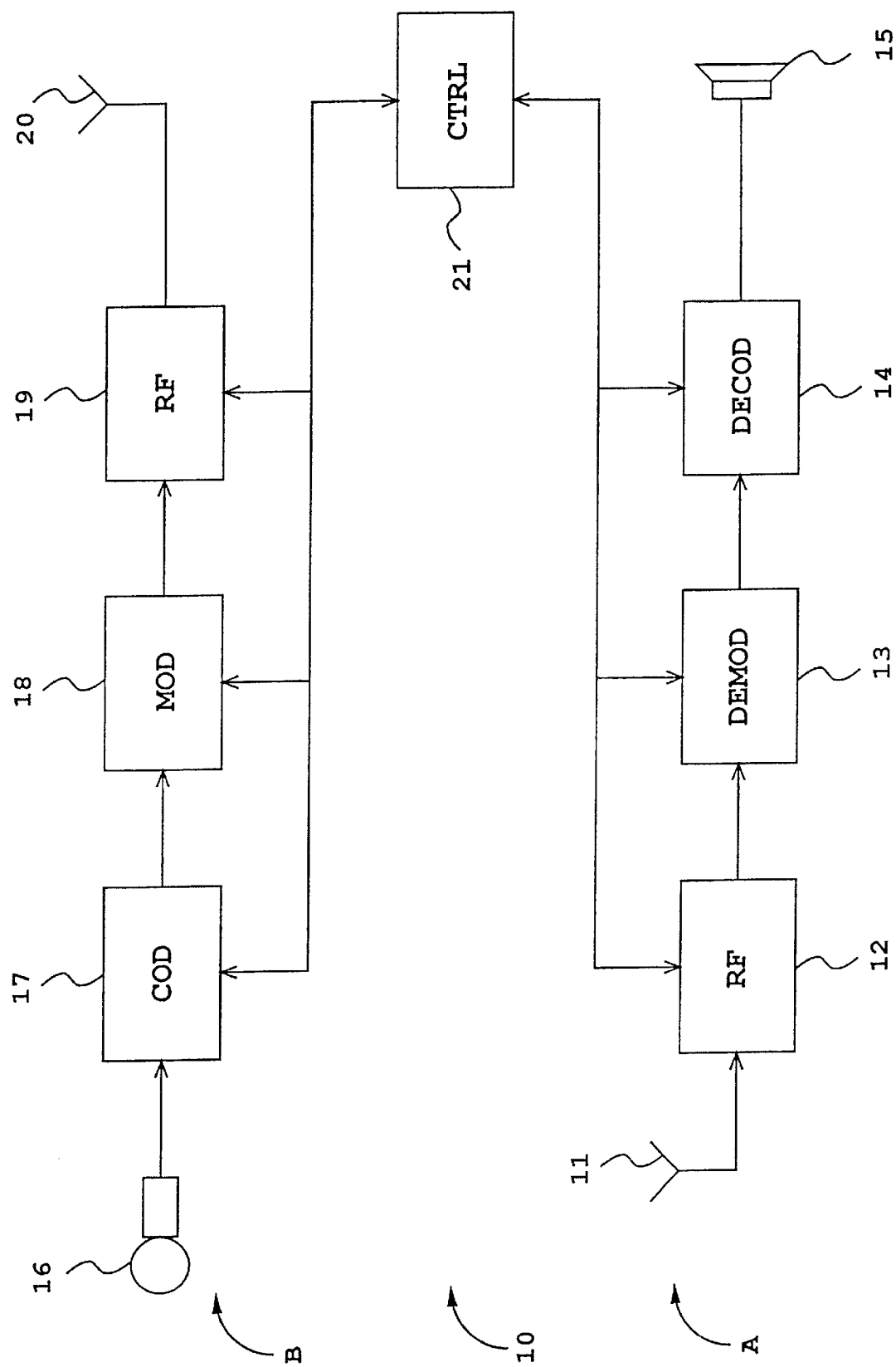
FIG. 4 is a block diagram showing the structure of the subscriber terminal of the cellular radio system of the invention.

Let us next study the structure of the transceiver of the cellular radio system of the invention. FIG. 4 is a block diagram showing the essential parts of the structure of a subscriber terminal in the cellular radio system of the invention by way of example. It will be understood by those skilled in the art that a base station also comprises corresponding components.

A subscriber terminal 10 comprises a reception side A and a transmission side B. The reception side A comprises an antenna 11 for carrying a received signal to radio frequency units 12, in which the signal is converted into the intermediate and base band frequency and in which the signal is converted into digital form. From the radio frequency units the signal is carried to demodulation means 13, in which the signal is demodulated and detected. From the demodulation means the signal is carried further to decoding means 14, in which channel and speech decoding is performed. From the decoding means the signal is carried to a speaker 15.

The transmission side B comprises a microphone 16, from which the signal is carried through encoding means 17 to modulation means 18 and further to radio frequency units 19, which convert and amplify the signal to radio frequencies and transmit it by an antenna 20. The subscriber terminal further comprises control means 21, shared by the reception side A and the transmission side B. The transceiver of the invention naturally also comprises other components, e.g. filters, as will be understood by those skilled in the art. However, for the sake of clarity, they are not shown.

The transceiver of the cellular radio system of the invention comprises means for transmitting in two time slots and receiving in two time slots during one frame. The subscriber terminal of the cellular radio system of the invention further comprises means for employing the time slots of the frame following the frame used for transmission and reception for measuring neighboring base stations.

Even though the invention has been explained in the above with reference to the example in accordance with the accompanying drawings, it is obvious that the invention is not restricted to it but can be modified in various ways within the scope of the inventive idea disclosed in the attached claims.

What is claimed is:

1. A method of improving connection quality and system capacity in a cellular radio system comprising at least one base station communicating with subscriber terminals, the base station transmitting on at least one carrier wave frequency a signal being time divided into a frame consisting of a plurality of time slots and utilizing two successive frames on the same transmission direction for different purposes, the method comprising:

transmitting in two time slots and receiving in two time slots during a first frame of the two successive frames; and measuring neighbouring base stations during a second frame of the two successive frames.

2. The method according to claim 1, wherein the time slots used for measuring neighbouring base stations are successive.

3. A cellular radio system comprising in each cell at least one base station communicating with subscriber terminals, the base station transmitting on at least one carrier wave frequency a signal being time divided into a frame consisting of a plurality of time slots and utilizing two successive frames on the same transmission direction for different purposes, the cellular radio system comprising:

means for transmitting in two time slots and receiving in two time slots during a first frame of the two successive frames; and means for measuring neighbouring base stations during a second frame of the two successive frames.

4. The cellular radio system according to claim 3, wherein the subscriber terminals further comprise means for employing successive time slots for measuring neighboring base stations.

5. A method of improving connection quality and system capacity in a cellular radio system comprising at least one base station communicating with subscriber terminals, the base station transmitting on at least one carrier wave frequency a signal being time divided into a frame consisting of a plurality of time slots and utilizing two successive frames on the same transmission direction for different purposes, the method comprising:

the base stations transmitting information concerning themselves to the subscriber terminals;

the subscriber terminals transmitting in two time slots and receiving in two time slots during a first frame of the two successive frames; and measuring neighbouring base stations during a second frame of the two successive frames.

\* \* \* \* \*